United States Patent
Liu et al.

(10) Patent No.: US 12,404,352 B2
(45) Date of Patent: Sep. 2, 2025

(54) ENCAPSULATED CATALYST FOR ONE-PART ORGANOPOLYSILOXANE SYSTEMS AND METHODS RELATED THERETO

(71) Applicant: NUSIL TECHNOLOGY LLC, Carpinteria, CA (US)

(72) Inventors: Jianhua Liu, Camarillo, CA (US); James Michael Lambert, Glen Allen, VA (US)

(73) Assignee: NUSIL TECHNOLOGY LLC, Carpinteria, CA (US)

( * ) Notice: Subject to any disclaimer, the term of this patent is extended or adjusted under 35 U.S.C. 154(b) by 759 days.

(21) Appl. No.: 17/779,772

(22) PCT Filed: Dec. 3, 2020

(86) PCT No.: PCT/US2020/063048
§ 371 (c)(1),
(2) Date: May 25, 2022

(87) PCT Pub. No.: WO2021/113470
PCT Pub. Date: Jun. 10, 2021

(65) Prior Publication Data
US 2023/0025643 A1    Jan. 26, 2023

Related U.S. Application Data

(60) Provisional application No. 62/944,394, filed on Dec. 6, 2019.

(51) Int. Cl.
| | | |
|---|---|---|
| *C08K 5/10* | (2006.01) | |
| *B01J 23/42* | (2006.01) | |
| *B01J 35/30* | (2024.01) | |
| *C08F 4/02* | (2006.01) | |
| *C08L 83/04* | (2006.01) | |

(52) U.S. Cl.
CPC .............. *C08F 4/027* (2013.01); *B01J 23/42* (2013.01); *B01J 35/398* (2024.01); *C08K 5/10* (2013.01); *C08L 83/04* (2013.01)

(58) Field of Classification Search
None
See application file for complete search history.

(56) References Cited

U.S. PATENT DOCUMENTS

| | | | | |
|---|---|---|---|---|
| 4,766,176 A * | 8/1988 | Lee | .......................... | C08J 3/241 528/31 |
| 4,784,879 A * | 11/1988 | Lee | .......................... | C08K 9/10 528/901 |
| 4,874,667 A * | 10/1989 | Lee | .......................... | C08K 9/10 528/901 |
| 5,009,957 A * | 4/1991 | Lee | .......................... | C08K 9/10 528/901 |
| 5,017,654 A * | 5/1991 | Togashi | .................... | C08K 9/10 525/477 |
| 5,153,160 A * | 10/1992 | Saruyama | ................. | C08J 3/122 502/9 |
| 5,232,959 A * | 8/1993 | Togashi | .................... | C08L 83/04 556/451 |
| 5,904,887 A | 5/1999 | Nakamura et al. | | |
| 7,307,193 B2 * | 12/2007 | Kobayashi | ............ | B01J 31/2404 568/687 |
| 8,373,286 B2 | 2/2013 | Yoshitake et al. | | |
| 9,227,183 B2 | 1/2016 | Sutoh et al. | | |
| 10,364,353 B2 | 7/2019 | Morita et al. | | |
| 2015/0246349 A1 | 9/2015 | Sutoh et al. | | |
| 2017/0073518 A1 | 3/2017 | Morita et al. | | |
| 2017/0233572 A1 | 8/2017 | Boucard et al. | | |

FOREIGN PATENT DOCUMENTS

| | | |
|---|---|---|
| CN | 104583297 | 4/2015 |
| JP | H0429748 A | 1/1992 |
| JP | H0899332 A | 4/1996 |
| JP | 2014024986 | 2/2014 |
| JP | 2017179033 A | 10/2017 |
| WO | WO 2005/123839 A1 | 12/2005 |
| WO | WO 2007/032481 A1 | 3/2007 |
| WO | WO 2014/017671 | 1/2014 |
| WO | WO2016052521 | 4/2017 |

OTHER PUBLICATIONS

International Search Report and Written Opinion were mailed on Feb. 12, 2021 by the International Searching Authority for International Application No. PCT/US 2020/63048 filed on Dec. 3, 2020 and published as WO 2021/113470A1 (Applicant- Nusil Technology LLC) (8 pages).

* cited by examiner

*Primary Examiner* — Robert S Loewe
(74) *Attorney, Agent, or Firm* — Ballard Spahr LLP

(57) ABSTRACT

Described is a particle having a platinum-group catalyst that is fully encapsulated within a thermoplastic polymer. The particle can be used in a curable organopolysiloxane composition that also includes organopolysiloxane components.

20 Claims, 7 Drawing Sheets

ENCAPSULATED CATALYST FOR ONE-PART ORGANOPOLYSILOXANE SYSTEMS AND METHODS RELATED THERETO

This application is a U.S. National Phase Application under 35 U.S.C. § 371 of International Application No. PCT/US2020/063048, filed on Dec. 3, 2020, which claims the benefit of U.S. Provisional Patent Application No. 62/944,394, filed on Dec. 6, 2019. The content of these earlier filed applications is hereby incorporated herein by reference in their entirety.

FIELD OF INVENTION

This disclosure relates to a particle containing a catalyst that is suitable to be to be used in the curing of one-part silicone systems. The disclosure also relates to method of how to make and use such a particle.

BACKGROUND

In order to cure certain types of compositions, contact between a curable component contained in the composition and a catalyst is sometimes necessary. For example, in the case of a hydrosilylation reaction-curable organopolysiloxane composition, the curable component in the composition is crosslinked by a hydrosilylation reaction catalyst such as a platinum-group catalyst, but curing begins when the catalyst and the curable component come into contact, so it is necessary to prevent the catalyst and the curable component from coming into contact with one another during storage, for example, until curing is required.

One mode for avoiding contact between the catalyst and the curable component is a so-called two-component composition, a first part of which contains the catalyst and a second part of which contains the curable component. However, two-component compositions have poor workability due to the need to mix the two components immediately before use, for example. Moreover, two-component compositions are complicated to handle and sometimes even require a complex device for mixing.

Therefore, so-called one-component compositions can be used where the catalyst and the curable component are present in the same system. In a one-component composition, the catalyst can be coated or micro-encapsulated to ensure that the catalyst and the curable component do not come into contact.

However, one-component curable organopolysiloxane compositions containing an encapsulated catalyst can have problems of consistently performing as desired from batch to batch, and to work within specific parameters. For example, in a conventional one-component curable organopolysiloxane composition, it has been observed that the platinum-group catalyst and the polysiloxane component come into contact during storage and that changes occur over time due to a hydrosilylation reaction. The viscosity of the composition increases as a result, which causes the composition to cure. In addition, high curing temperatures (e.g., greater than 100° C.) are typically required to release Pt from encapsulated particles, limiting their applications into areas where other temperature-sensitive materials or components are involved. The catalyst releasing rate is not sufficient to achieve a snap cure at required temperatures, especially in lower curing temperature region (e.g., 30 to 100° C.).

Thus, there is a need for improved one-component compositions. Such a particle, composition, and methods related thereto are disclosed herein.

SUMMARY OF THE INVENTION

Disclosed herein is a particle. The particle comprises at least two components: 1. a platinum-group catalyst, and 2. a molecular weight controlled thermoplastic polymer having a $T_g$ or softening temperature of at least 20° C. The platinum-group catalyst is fully encapsulated within the thermoplastic polymer. The molecular weight controlled thermoplastic polymer can be polystyrene or a co-polymer thereof having a weight-average molecular weight ($M_w$) from about 500 g/mol to about 30,000 g/mol, and a polydispersity index (PDI) of less than 2. In another example, the molecular weight controlled thermoplastic polymer can be polymethylmethacrylate or a co-polymer thereof having a $M_w$ from about 500 g/mol to about 30,000 g/mol, and a PDI of less than 2. In another example, the molecular weight controlled thermoplastic polymer can be polyacrylonitrile or a co-polymer thereof having a $M_w$ from about 500 g/mol to about 30,000 g/mol, and a PDI of less than 2. The use of the molecular weight controlled thermoplastic polymers disclosed herein to fully encapsulate the platinum-group catalyst provides for a particle with a tunable low activation temperature. Such a particle provides for a reproducible system having low batch-by-batch variation. Such a system provides for a reliable system having a repeatable catalyst release rate at desired temperatures, which results in a snap cure of a curable organopolysiloxane composition, such as a one-part curable organopolysiloxane composition.

Also disclosed herein is a curable organopolysiloxane composition. The curable organopolysiloxane composition comprises at least three components: 1. an organopolysiloxane represented by the average unit formula: $R_aSiO_{(4-a)/2}$, wherein, R is a substituted or unsubstituted monovalent hydrocarbon group, and "a" is a number from 1.0 to 2.4, and having at least an average of 1.5 alkenyl groups in a molecule, and 2. an organopolysiloxane having at least an average of 1.5 silicon-bonded hydrogen atoms in a molecule, and 3. a particle disclosed herein.

Also disclosed herein is a method. The method uses the compositions and particles disclosed herein. The method comprises the steps of providing a curable organopolysiloxane composition disclosed herein. The curable organopolysiloxane composition is heated to a temperature effective to melt the thermoplastic polymer to release the platinum-group catalyst, thereby promoting a crosslinking reaction between the organopolysiloxane represented by the average unit formula: $R_aSiO_{(4-a)/2}$ and the organopolysiloxane having at least an average of 1.5 silicon-bonded hydrogen atoms in a molecule, to cure the curable organopolysiloxane composition.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION

Figure 1:
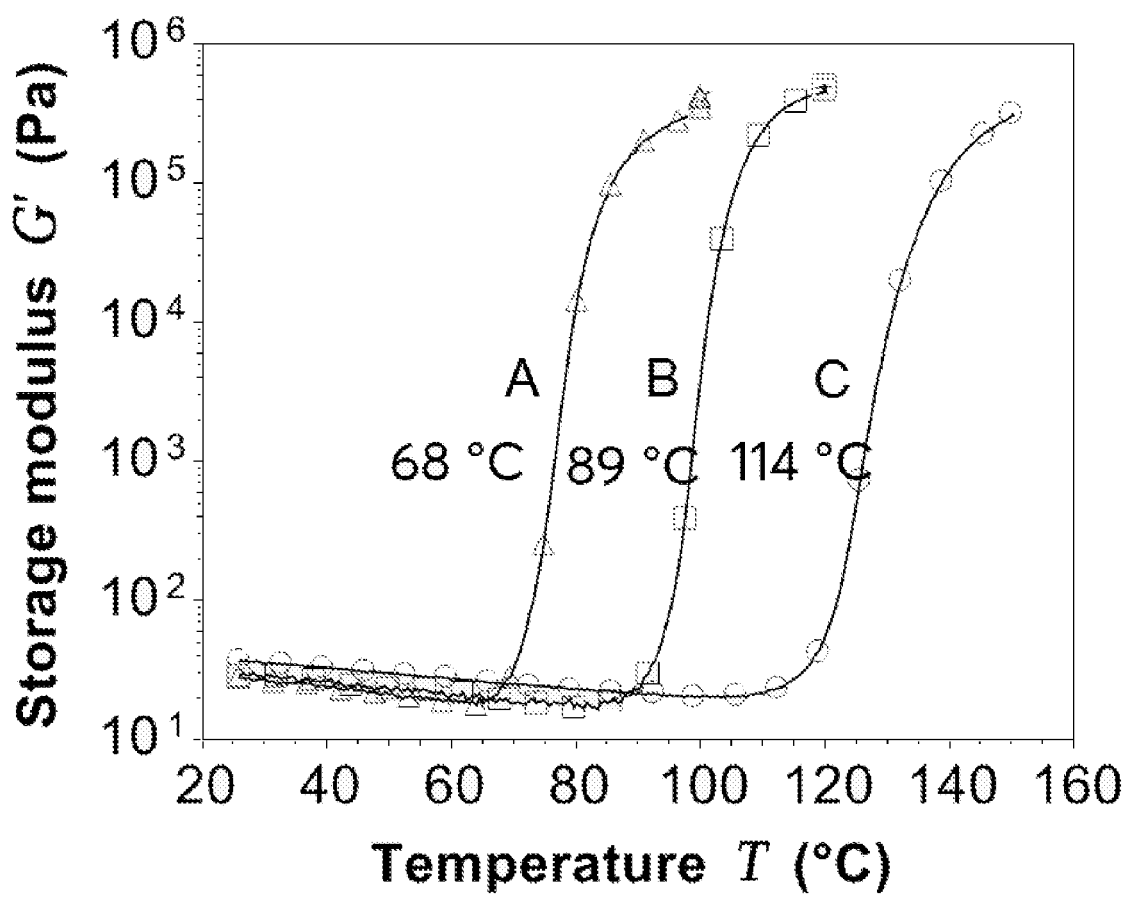
FIG. 1 shows curing profiles of two non-limiting exemplary one-part compositions (compositions A and B, based on molecular weight controlled polystyrene) disclosed herein and a control (composition C) by controlled stress rheometer (CSR).

The present invention can be understood more readily by reference to the following detailed description of the invention and the examples included therein.

Before the present particles, compositions, articles, systems, devices, and/or methods are disclosed and described, it is to be understood that they are not limited to specific methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. DEFINITIONS

As used herein, nomenclature for compounds can be given using common names as well as names assigned by the International Union of Pure and Applied Chemistry (IUPAC), Chemical Abstracts Service (CAS) recommendations for nomenclature, hereby incorporated herein by reference. One of skill in the art can readily ascertain the structure of a compound and if given a name by systemic reduction of the compound structure using naming conventions.

As used in the specification and the appended claims, the singular forms "a," "an," and "the" include plural referents unless the context clearly dictates otherwise.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component denotes the weight relationship between the element or component and any other elements or components or article for which a part by weight is expressed. Thus, in a composition comprising two parts by weight of component X and five parts by weight component Y, X and Y are present at a weight ratio of 2:5 or 2/5 or 0.4, and are present in such ratio regardless of whether additional components are contained in the compound. Additionally, references in the specification and concluding claims to molar ratios of a particular element or component denotes the molar relationship between the element or component and any other elements or components in the composition or article for which a molar ratio is expressed. Thus, in a composition containing five moles of component X and two moles component Y, X and Y are present at a molar ratio of 5:2 or 5/2 or 2.5 and are present in such ratio regardless of whether additional components are contained in the composition.

A weight percent (wt %) of a component, unless specifically stated to the contrary, is based on total weight of the formulation or composition in which the component is included.

As used herein, the terms "optional" or "optionally" means that a subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow, plain meaning derived from grammatical organization or punctuation, and number or type of embodiments described in the specification.

Disclosed are components to be used to make the particles and compositions disclosed herein as well as what to be used within the methods disclosed herein. These and other compounds are disclosed herein, and it is understood that when combinations, subsets, interactions, groups, etcetera, of these materials are disclosed that while specific reference of each various individual and collective combinations and permutation of these components cannot be explicitly disclosed, each is specifically contemplated and described herein. For example, if a particular silicone composition is disclosed and discussed and a number of modifications that can be made to a number of compounds including the silicone compositions are discussed, specifically contemplated is each and every combination and permutation of the composition and modifications that are possible unless specifically indicated to the contrary. Thus, if a class of compounds A, B, and C are disclosed as well as a class of silicone compositions D, E, and F and an example of a particle or composition, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using silicone compositions. Thus, if there are a variety of additional steps that can be performed, it is understood that each of these additional steps can be performed with any specific embodiment or combination of embodiments of the methods of the invention.

B. PARTICLE

Disclosed herein is a particle that is useful in a one-component curable organopolysiloxane composition. Disclosed herein is a particle comprising:
a) a platinum-group catalyst; and
b) a molecular weight controlled thermoplastic polymer having a $T_g$ or softening temperature of at least 20° C. selected from the group consisting of:
 a. polystyrene or a co-polymer thereof having a $M_w$ from about 500 g/mol to about 30,000 g/mol, and a polydispersity index (PDI) of less than 2;
 b. polymethylmethacrylate or a co-polymer thereof having a $M_w$ from about 500 g/mol to about 30,000 g/mol, and a PDI of less than 2;
 c. polyacrylonitrile or a co-polymer thereof having a $M_w$ from about 500 g/mol to about 30,000 g/mol, and a PDI of less than 2;
 wherein the platinum-group catalyst is fully encapsulated within the thermoplastic polymer.

The molecular weight controlled thermoplastic polymer used in the disclosed particle has a narrow molecular weight and a narrow polydispersity index (PDI) that allows for lower and more defined activation temperatures when the particle is used in a one-component curable organopolysiloxane composition. It is desired to tailor the activation temperature to specific uses. Also, by having a narrow molecular weight and a narrow PDI the reproducibility of the particle improves, meaning that each batch of particles behave nearly identical with respect to the activation temperature. Having a large PDI (for example above 2) can cause each batch of particles to have significantly different activation temperatures, making the particle less predictable.

The catalyst is a hydrosilylation catalyst. In one aspect, the platinum group catalyst is selected from the group consisting of platinum (Pt), palladium (Pd), ruthenium (Ru), rhodium (Rh), osmium (Os), iridium (Ir), and combination thereof. For example, the platinum group catalyst can be platinum. In another example, the platinum group catalyst can be palladium. In yet another example, the platinum group catalyst can be ruthenium. In yet another example, the platinum group catalyst can be rhodium. In yet another example, the platinum group catalyst can be osmium. In yet another example, the platinum group catalyst can be iridium. Non-limiting specific hydrosilylation reaction catalysts include platinum black, platinum-supported alumina powders, platinum-supported silica powders, platinum-supported carbon powders, chloroplatinic acids, alcohol solutions of chloroplatinic acids, complexes of platinum and olefin, complexes of platinum and alkenyl siloxanes such as divinyltetramethyldisiloxane, and catalysts prepared by further diluting a complex of platinum and an alkenyl siloxane with an alkenyl siloxane, a siloxane oligomer, or the like; palladium-based catalysts such as tetrakis(triphenylphosphine)palladium; and rhodium-based catalysts.

In one aspect, the particle comprises from about 0.01 wt % to about 50 wt % of the platinum-group catalyst. For example, the particle can comprise from about 0.01 wt % to about 40 wt % of the platinum-group catalyst. In another example, the particle can comprise from about 0.01 wt % to about 30 wt % of the platinum-group catalyst. In yet another example, the particle can comprise from about 0.1 wt % to about 50 wt % of the platinum-group catalyst. In yet another example, the particle can comprise from about 0.1 wt % to about 40 wt % of the platinum-group catalyst. In yet another example, the particle can comprise from about 0.1 wt % to about 30 wt % of the platinum-group catalyst. In yet another example, the particle can comprise from about 0.1 wt % to about 20 wt % of the platinum-group catalyst. In yet another example, the particle can comprise from about 0.1 wt % to about 10 wt % of the platinum-group catalyst. In another example, the particle can comprise from about 1 wt % to about 10 wt % of the platinum-group catalyst. In yet another example, the particle can comprise from about 2 wt % to about 10 wt % of the platinum-group catalyst. In another example, the particle can comprise from about 10 wt % to about 50 wt % of the platinum-group catalyst. In yet another example, the particle can comprise from about 20 wt % to about 50 wt % of the platinum-group catalyst.

In one aspect, the molecular weight controlled thermoplastic polymer can have a $T_g$ or softening temperature of at least 30° C. For example, the molecular weight controlled thermoplastic polymer can have a $T_g$ or softening temperature of at least 40° C. In another example, the molecular weight controlled thermoplastic polymer can have a $T_g$ or softening temperature of at least 50° C. In yet another example, the molecular weight controlled thermoplastic polymer can have a $T_g$ or softening temperature of at least 60° C. In yet another example, the molecular weight controlled thermoplastic polymer can have a $T_g$ or softening temperature of at least 70° C. In yet another example, the molecular weight controlled thermoplastic polymer can have a $T_g$ or softening temperature of at least 80° C. In yet another example, the molecular weight controlled thermoplastic polymer can have a $T_g$ or softening temperature of at least 90° C. In yet another example, the molecular weight controlled thermoplastic polymer can have a $T_g$ or softening temperature from 20° C. to 100° C. In yet another example, the molecular weight controlled thermoplastic polymer can have a $T_g$ or softening temperature from 30° C. to 100° C. In yet another example, the molecular weight controlled thermoplastic polymer can have a $T_g$ or softening temperature from 50° C. to 100° C. In yet another example, the molecular weight controlled thermoplastic polymer can have a $T_g$ or softening temperature from 70° C. to 100° C. In yet another example, the molecular weight controlled thermoplastic polymer can have a $T_g$ or softening temperature from 20° C. to 80° C. In yet another example, the molecular weight controlled thermoplastic polymer can have a $T_g$ or softening temperature from 20° C. to 60° C.

In one aspect, the molecular weight controlled thermoplastic polymer can have a $T_g$ temperature of at least 20° C. For example, the molecular weight controlled thermoplastic polymer can have a $T_g$ of at least 40° C. In another example, the molecular weight controlled thermoplastic polymer can have a $T_g$ of at least 50° C. In yet another example, the molecular weight controlled thermoplastic polymer can have a $T_g$ of at least 60° C. In yet another example, the molecular weight controlled thermoplastic polymer can have a $T_g$ of at least 70° C. In yet another example, the molecular weight controlled thermoplastic polymer can have a $T_g$ of at least 80° C. In yet another example, the molecular weight controlled thermoplastic polymer can have a $T_g$ of at least 90° C. In yet another example, the molecular weight controlled thermoplastic polymer can have a $T_g$ from 20° C. to 100° C. In yet another example, the molecular weight controlled thermoplastic polymer can have a $T_g$ from 30° C. to 100° C. In yet another example, the molecular weight controlled thermoplastic polymer can have a $T_g$ from 50° C. to 100° C. In yet another example, the molecular weight controlled thermoplastic polymer can have a $T_g$ from 70° C. to 100° C. In yet another example, the molecular weight controlled thermoplastic polymer can have a $T_g$ from 20° C. to 80° C. In yet another example, the molecular weight controlled thermoplastic polymer can have a $T_g$ from 20° C. to 60° C.

In one aspect, the molecular weight controlled thermoplastic polymer can have a softening temperature of at least 20° C. For example, the molecular weight controlled thermoplastic polymer can have a softening temperature of at least 40° C. In another example, the molecular weight controlled thermoplastic polymer can have a softening temperature of at least 50° C. In yet another example, the molecular weight controlled thermoplastic polymer can have a softening temperature of at least 60° C. In yet another example, the molecular weight controlled thermoplastic polymer can have a softening temperature of at least 70° C. In yet another example, the molecular weight controlled thermoplastic polymer can have a softening temperature of at least 80° C. In yet another example, the molecular weight controlled thermoplastic polymer can have a softening temperature of at least 90° C. In yet another example, the molecular weight controlled thermoplastic polymer can have a softening temperature from 20° C. to 100° C. In yet another example, the molecular weight controlled thermoplastic polymer can have a softening temperature from 30° C. to 100° C. In yet another example, the molecular weight controlled thermoplastic polymer can have a softening temperature from 50° C. to 100° C. In yet another example, the molecular weight controlled thermoplastic polymer can have a softening temperature from 70° C. to 100° C. In yet another example, the molecular weight controlled thermoplastic polymer can have a softening temperature from 20° C. to 80° C. In yet another example, the molecular weight controlled thermoplastic polymer can have a softening temperature from 20° C. to 60° C.

In one aspect, the molecular weight controlled thermoplastic polymer can have a melting temperature from 20° C. to 100° C. For example, the molecular weight controlled thermoplastic polymer can have a melting temperature from 40° C. to 100° C. In another example, the molecular weight controlled thermoplastic polymer can have a melting temperature from 50° C. to 100° C. In yet another example, the molecular weight controlled thermoplastic polymer can have a melting temperature from 60° C. to 100° C. In yet another example, the molecular weight controlled thermoplastic polymer can have a melting temperature from 30° C. to 90° C. In yet another example, the molecular weight controlled thermoplastic polymer can have a melting temperature from 30° C. to 60° C. In yet another example, the molecular weight controlled thermoplastic polymer can have a melting temperature from 60° C. to 90° C.

In one aspect, the thermoplastic polymer is polystyrene or a co-polymer thereof having a $M_w$ from about 500 g/mol to about 30,000 g/mol, and a polydispersity index (PDI) of less than 2. For example, the thermoplastic polymer can be polystyrene or a co-polymer thereof having a $M_w$ from about 500 g/mol to about 30,000 g/mol, and a polydispersity index (PDI) of less than 1.8. In another example, the thermoplastic polymer can be polystyrene or a co-polymer thereof having a $M_w$ from about 500 g/mol to about 30,000 g/mol, and a polydispersity index (PDI) of less than 1.5. In yet another example, the thermoplastic polymer can be polystyrene or a co-polymer thereof having a $M_w$ from about 500 g/mol to about 30,000 g/mol, and a polydispersity index (PDI) of less than 1.2. In yet another example, the thermoplastic polymer can be polystyrene or a co-polymer thereof having a $M_w$ from about 500 g/mol to about 30,000 g/mol, and a polydispersity index (PDI) of less than 1.1.

In one aspect, the thermoplastic polymer is polystyrene or a co-polymer thereof having a $M_w$ from about 1,000 g/mol to about 15,000 g/mol, and a polydispersity index (PDI) of less than 2. For example, the thermoplastic polymer can be polystyrene or a co-polymer thereof having a $M_w$ from about 1,000 g/mol to about 15,000 g/mol, and a polydispersity index (PDI) of less than 1.8. In another example, the thermoplastic polymer can be polystyrene or a co-polymer thereof having a $M_w$ from about 1,000 g/mol to about 15,000 g/mol, and a polydispersity index (PDI) of less than 1.5. In yet another example, the thermoplastic polymer can be polystyrene or a co-polymer thereof having a $M_w$ from about 1,000 g/mol to about 15,000 g/mol, and a polydispersity index (PDI) of less than 1.2. In yet another example, the thermoplastic polymer can be polystyrene or a co-polymer thereof having a $M_w$ from about 1,000 g/mol to about 15,000 g/mol, and a polydispersity index (PDI) of less than 1.1.

In one aspect, the thermoplastic polymer is polystyrene or a co-polymer thereof having a $M_w$ from about 15,000 g/mol to about 30,000 g/mol, and a polydispersity index (PDI) of less than 2. For example, the thermoplastic polymer can be polystyrene or a co-polymer thereof having a $M_w$ from about 15,000 g/mol to about 30,000 g/mol, and a polydispersity index (PDI) of less than 1.8. In another example, the thermoplastic polymer can be polystyrene or a co-polymer thereof having a $M_w$ from about 15,000 g/mol to about 30,000 g/mol, and a polydispersity index (PDI) of less than 1.5. In yet another example, the thermoplastic polymer can be polystyrene or a co-polymer thereof having a $M_w$ from about 15,000 g/mol to about 30,000 g/mol, and a polydispersity index (PDI) of less than 1.2. In yet another example, the thermoplastic polymer can be polystyrene or a co-polymer thereof having a $M_w$ from about 15,000 g/mol to about 30,000 g/mol, and a polydispersity index (PDI) of less than 1.1.

In one aspect, the thermoplastic polymer is polystyrene. In another aspect, the thermoplastic polymer is a co-polymer of polystyrene. Non-limiting examples of co-polymer of polystyrene include styrene-butadiene copolymer, styrene-isoprene copolymer, styrene-ethylene-butylene copolymer, styrene-N-vinylpyrrolidone copolymer, styrene-acrylonitrile copolymer, acrylonitrile-butadiene-styrene (ABS) copolymers, styrene-allyl alcohol copolymer, and styrene-maleic anhydride copolymer.

In one aspect, the thermoplastic polymer is polymethylmethacrylate or a co-polymer thereof having a $M_w$ from about 500 g/mol to about 30,000 g/mol, and a polydispersity index (PDI) of less than 2. For example, the thermoplastic polymer can be polymethylmethacrylate or a co-polymer thereof having a $M_w$ from about 500 g/mol to about 30,000 g/mol, and a polydispersity index (PDI) of less than 1.8. In another example, the thermoplastic polymer can be polymethylmethacrylate or a co-polymer thereof having a $M_w$ from about 500 g/mol to about 30,000 g/mol, and a polydispersity index (PDI) of less than 1.5. In yet another example, the thermoplastic polymer can be polymethylmethacrylate or a co-polymer thereof having a $M_w$ from about 500 g/mol to about 30,000 g/mol, and a polydispersity index (PDI) of less than 1.2. In yet another example, the thermoplastic polymer can be polymethylmethacrylate or a co-polymer thereof having a $M_w$ from about 500 g/mol to about 30,000 g/mol, and a polydispersity index (PDI) of less than 1.1.

In one aspect, the thermoplastic polymer is polymethylmethacrylate or a co-polymer thereof having a $M_w$ from about 1,000 g/mol to about 15,000 g/mol, and a polydispersity index (PDI) of less than 2. For example, the thermoplastic polymer can be polymethylmethacrylate or a co-polymer thereof having a $M_w$ from about 1,000 g/mol to about 15,000 g/mol, and a polydispersity index (PDI) of less than 1.8. In another example, the thermoplastic polymer can be polymethylmethacrylate or a co-polymer thereof having a $M_w$ from about 1,000 g/mol to about 15,000 g/mol, and a polydispersity index (PDI) of less than 1.5. In yet another example, the thermoplastic polymer can be polymethylmethacrylate or a co-polymer thereof having a $M_w$ from about 1,000 g/mol to about 15,000 g/mol, and a polydispersity index (PDI) of less than 1.2. In yet another example, the thermoplastic polymer can be polymethylmethacrylate or a co-polymer thereof having a $M_w$ from about 1,000 g/mol to about 15,000 g/mol, and a polydispersity index (PDI) of less than 1.1.

In one aspect, the thermoplastic polymer is polymethylmethacrylate or a co-polymer thereof having a $M_w$ from about 15,000 g/mol to about 30,000 g/mol, and a polydispersity index (PDI) of less than 2. For example, the thermoplastic polymer can be polymethylmethacrylate or a co-polymer thereof having a $M_w$ from about 15,000 g/mol to about 30,000 g/mol, and a polydispersity index (PDI) of less than 1.8. In another example, the thermoplastic polymer can be polymethylmethacrylate or a co-polymer thereof having a $M_w$ from about 15,000 g/mol to about 30,000 g/mol, and a polydispersity index (PDI) of less than 1.5. In yet another example, the thermoplastic polymer can be polymethylmethacrylate or a co-polymer thereof having a $M_w$ from about 15,000 g/mol to about 30,000 g/mol, and a polydispersity index (PDI) of less than 1.2. In yet another example, the thermoplastic polymer can be polymethylmethacrylate or a co-polymer thereof having a $M_w$ from about 15,000 g/mol to about 30,000 g/mol, and a polydispersity index (PDI) of less than 1.1.

In one aspect, the thermoplastic polymer is polymethylmethacrylate. In another aspect, the thermoplastic polymer is a co-polymer of polymethylmethacrylate. Non-limiting examples of co-polymer of polymethylmethacrylate include to polymethylmethacrylate-Styrene copolymers, polymethylmethacrylate-acrylate copolymers, and copolymers of polymethylmethacrylate with polymethacrylates having pendant groups, such as one or more n-butyl or n-hexyl groups.

In one aspect, the thermoplastic polymer is polyacrylonitrile or a co-polymer thereof having a $M_w$ from about 500 g/mol to about 30,000 g/mol, and a polydispersity index (PDI) of less than 2. For example, the thermoplastic polymer can be polyacrylonitrile or a co-polymer thereof having a $M_w$ from about 500 g/mol to about 30,000 g/mol, and a polydispersity index (PDI) of less than 1.8. In another example, the thermoplastic polymer can be polyacrylonitrile or a co-polymer thereof having a $M_w$ from about 500 g/mol to about 30,000 g/mol, and a polydispersity index (PDI) of less than 1.5. In yet another example, the thermoplastic polymer can be polyacrylonitrile or a co-polymer thereof having a $M_w$ from about 500 g/mol to about 30,000 g/mol, and a polydispersity index (PDI) of less than 1.2. In yet another example, the thermoplastic polymer can be polyacrylonitrile or a co-polymer thereof having a $M_w$ from about 500 g/mol to about 30,000 g/mol, and a polydispersity index (PDI) of less than 1.1.

In one aspect, the thermoplastic polymer is polyacrylonitrile or a co-polymer thereof having a $M_w$ from about 1,000 g/mol to about 15,000 g/mol, and a polydispersity index (PDI) of less than 2. For example, the thermoplastic polymer can be polyacrylonitrile or a co-polymer thereof having a $M_w$ from about 1,000 g/mol to about 15,000 g/mol, and a polydispersity index (PDI) of less than 1.8. In another example, the thermoplastic polymer can be polyacrylonitrile or a co-polymer thereof having a $M_w$ from about 1,000 g/mol to about 15,000 g/mol, and a polydispersity index (PDI) of less than 1.5. In yet another example, the thermoplastic polymer can be polyacrylonitrile or a co-polymer thereof having a $M_w$ from about 1,000 g/mol to about 15,000 g/mol, and a polydispersity index (PDI) of less than 1.2. In yet another example, the thermoplastic polymer can be polyacrylonitrile or a co-polymer thereof having a $M_w$ from about 1,000 g/mol to about 15,000 g/mol, and a polydispersity index (PDI) of less than 1.1.

In one aspect, the thermoplastic polymer is polyacrylonitrile or a co-polymer thereof having a $M_w$ from about 15,000 g/mol to about 30,000 g/mol, and a polydispersity index (PDI) of less than 2. For example, the thermoplastic polymer can be polyacrylonitrile or a co-polymer thereof having a $M_w$ from about 15,000 g/mol to about 30,000 g/mol, and a polydispersity index (PDI) of less than 1.8. In another example, the thermoplastic polymer can be polyacrylonitrile or a co-polymer thereof having a $M_w$ from about 15,000 g/mol to about 30,000 g/mol, and a polydispersity index (PDI) of less than 1.5. In yet another example, the thermoplastic polymer can be polyacrylonitrile or a co-polymer thereof having a $M_w$ from about 15,000 g/mol to about 30,000 g/mol, and a polydispersity index (PDI) of less than 1.2. In yet another example, the thermoplastic polymer can be polyacrylonitrile or a co-polymer thereof having a $M_w$ from about 15,000 g/mol to about 30,000 g/mol, and a polydispersity index (PDI) of less than 1.1.

In one aspect, the thermoplastic polymer is polyacrylonitrile. In another aspect, the thermoplastic polymer is a co-polymer of polyacrylonitrile. Non-limiting examples of co-polymer of polyacrylonitrile include to polyacrylonitrile-butadiene copolymer, and polyacrylonitrile-butadiene-styrene (ABS) copolymer.

In one aspect, the particle has an average particle diameter from about 0.01 µm to about 500 µm. For example, the can have an average particle diameter from about 0.01 µm to about 300 µm. In another example, the can have an average particle diameter from about 0.01 µm to about 150 µm. In yet another example, the can have an average particle diameter from about 0.01 µm to about 100 µm. In yet another example, the can have an average particle diameter from about 0.01 µm to about 80 µm. In yet another example, the can have an average particle diameter from about 0.01 µm to about 50 µm. In yet another example, the can have an average particle diameter from about 0.01 µm to about 30 µm. In yet another example, the can have an average particle diameter from about 0.01 µm to about 20 µm. In yet another example, the can have an average particle diameter from about 1 μm to about 30 μm. In yet another example, the can have an average particle diameter from about 100 μm to about 300 μm. In yet another example, the can have an average particle diameter from about 100 μm to about 500 μm.

The particle disclosed herein can be made by emulsion techniques. For example, the platinum-group catalyst and the thermoplastic polymer can be added to an oil/water system. The system can be sheared to cause micelle formation. The solvent can be removed to cause the micelles to consolidate. The micelles can be filtered, washed, and dried.

The particle disclosed herein can also be made using spray drying techniques. For example, the platinum-group catalyst and the thermoplastic polymer can be added to a solvent system. The solvent system dissolves the thermoplastic polymer. The particles can then be made by spraying the solvent system as an aerosol. The particles can be washed and dried.

C. COMPOSITION

Disclosed herein is a one-component curable organopolysiloxane composition containing the particle disclosed herein. The curable organopolysiloxane composition is cured when the platinum-group catalyst comes into contact with the siloxane components in the organopolysiloxane composition. This happens when the organopolysiloxane composition is heated to a temperature that causes the thermoplastic polymer to soften or melt such that the platinum-group catalyst becomes exposed to the siloxane components in the organopolysiloxane composition, which causes the organopolysiloxane composition to cure.

During storage, the organopolysiloxane composition is kept at a low enough temperature to prevent the thermoplastic polymer from softening or melting such that the platinum-group catalyst becomes exposed to the siloxane components. During use, heat is applied to the organopolysiloxane composition at the desired time, for example when the organopolysiloxane composition has been applied to a surface, and the heat increases the temperature of the organopolysiloxane composition to a point where the thermoplastic polymer softens or melts such that the platinum-group catalyst becomes exposed to the siloxane components.

Disclosed herein is a curable organopolysiloxane composition comprising:
  (A) an organopolysiloxane represented by the average unit formula:

$R_aSiO_{(4-a)/2}$ wherein, R is a substituted or unsubstituted monovalent hydrocarbon group, and "a" is a number from 1.0 to 2.4, and having at least an average of 1.5 alkenyl groups in a molecule;
  (B) an organopolysiloxane having at least an average of 1.5 silicon-bonded hydrogen atoms in a molecule; and
  (C) a particle disclosed herein.

In the $R_aSiO_{(4-a)/2}$ formula, R is a substituted or unsubstituted monovalent hydrocarbon group, and examples of this monovalent hydrocarbon group include alkyl groups such as methyl groups, ethyl groups, propyl groups, butyl groups, pentyl groups, and hexyl groups; alkenyl groups such as vinyl groups, allyl groups, butenyl groups, pentenyl groups, hexenyl groups, and heptenyl groups; aryl groups such as phenyl groups, tolyl groups, and xylyl groups; aralkyl groups such as benzyl groups and phenethyl groups; and halogenated alkyl groups such as 3-chloropropyl groups and 3,3,3-trifluoropropyl groups. For example, at least an average of 1.5 groups of R in a molecule are alkenyl groups such as those described above. Vinyl groups and hexenyl groups can be the alkenyl groups. Methyl groups and phenyl groups can be silicon-bonded groups other than the alkenyl groups.

In the $R_aSiO_{(4-a)/2}$ formula above, "a" is a number from 1.0 to 2.4. Examples of molecular structures of such component (A) include a straight chain structure, a partially branched straight chain structure, a branched chain structure, a reticulated structure, and a dendritic structure. Component (A) may be a mixture of two or more types of organopolysiloxanes having these molecular structures. That is, a may be either 1≤a<2 or 2≤a<2.4. A viscosity at 25° C. of the organopolysiloxane is not limited to but can be within the range of from 50 to 1,000,000 mPa·s, such as within the range of from 100 to 500,000 mPa·s.

Examples of the organopolysiloxane of formula $R_aSiO_{(4-a)/2}$ include, but are not limited to, dimethylsiloxane-methylvinylsiloxane copolymers capped at both molecular terminals with trimethylsiloxy groups, methylvinylpolysiloxanes capped at both molecular terminals with trimethylsiloxy groups, methylvinylsiloxane-methylphenylsiloxane copolymers capped at both molecular terminals with trimethylsiloxy groups, dimethylsiloxane-methylvinylsiloxane-methylphenylsiloxane copolymers capped at both molecular terminals with trimethylsiloxy groups, dimethylpolysiloxanes capped at both molecular terminals with dimethylvinylsiloxy groups, methylvinylpolysiloxanes capped at both molecular terminals with dimethylvinylsiloxy groups, methylphenylpolysiloxanes capped at both molecular terminals with dimethylvinylsiloxy groups, dimethylsiloxane-methylvinylsiloxane copolymers capped at both molecular terminals with dimethylvinylsiloxy groups, methylvinylsiloxane-methylphenylsiloxane copolymers capped at both molecular terminals with dimethylvinylsiloxy groups, methylvinylsiloxane-diphenylsiloxane copolymers capped at both molecular terminals with dimethylvinylsiloxy groups, dimethylvinylsiloxane-diphenylsiloxane copolymers capped at both molecular terminals with dimethylvinylsiloxy groups, methylvinylpolysiloxanes capped at one molecular terminal with a trimethylsiloxy group and the other molecular terminal with a dimethylvinylsiloxy group, dimethylsiloxane-methylvinylsiloxane copolymers capped at one molecular terminal with a trimethylsiloxy group and the other molecular terminal with a dimethylvinylsiloxy group, organopolysiloxanes comprising a unit represented by the formula: $R_3SiO_{1/2}$ and a unit represented by the formula: $SiO_{4/2}$, organopolysiloxanes comprising a unit represented by the formula: $RSiO_{3/2}$, organopolysiloxanes comprising a unit represented by the formula: $R_2SiO_{2/2}$ and a unit represented by the formula: $RSiO_{3/2}$, organopolysiloxanes comprising a unit represented by the formula: $R_2SiO_{2/2}$, a unit represented by the formula: $RSiO_{3/2}$, and a unit represented by the formula: $SiO_{4/2}$, and mixtures of two or more types of these organopolysiloxanes. R in the formulas above is a substituted or unsubstituted monovalent hydrocarbon group as described above.

As the organopolysiloxane of formula $R_aSiO_{(4-a)/2}$, it is also contemplated to use an organopolysiloxane mixture with an average number of 1.5 alkenyl groups in a molecule by mixing an organopolysiloxane listed above having at least 2 alkenyl groups in a molecule and an organopolysiloxane listed below having no alkenyl groups or having less than 2 alkenyl groups in a molecule. Examples of such an organopolysiloxane having no alkenyl groups or having less than 2 alkenyl groups in a molecule include dimethylpolysiloxanes capped at one molecular terminal with a dimethylvinylsiloxy group and the other molecular terminal with a trimethylsiloxy group, methylphenylpolysiloxanes capped at one molecular terminal with a dimethylvinylsiloxy group and the other molecular terminal with a trimethylsiloxy group, dimethylsiloxane-methylvinylsiloxane copolymers capped at both molecular terminals with trimethylsiloxy groups and having 1 vinyl group on the molecular side chains, dimethylpolysiloxanes capped at both molecular terminals with trimethylsiloxy groups, and methylphenylpolysiloxanes capped at both molecular terminals with trimethylsiloxy groups.

Component (B) in the curable organopolysiloxane composition is a crosslinking agent and is an organopolysiloxane having at least an average of 1.5 silicon-bonded hydrogen atoms in a molecule. For example, the organopolysiloxane can have least an average of 2 silicon-bonded hydrogen atoms in a molecule. The bonding sites of the silicon-bonded hydrogen atoms can be molecular terminals, molecular side chains, or molecular terminals and molecular side chains. Examples of silicon-bonded groups other than hydrogen atoms include substituted or unsubstituted monovalent hydrocarbon groups such as methyl groups, ethyl groups, propyl groups, butyl groups, pentyl groups, and hexyl groups; alkenyl groups such as vinyl groups, allyl groups, butenyl groups, pentenyl groups, hexenyl groups, and heptenyl groups; aryl groups such as phenyl groups, tolyl groups, and xylyl groups; aralkyl groups such as benzyl groups and phenethyl groups; and halogenated alkyl groups such as 3-chloropropyl groups and 3,3,3-trifluoropropyl groups as well as alkoxy silyl alkyl groups such as trimethoxysilylethyl groups, methyldimethoxysilylethyl groups, triethoxysilylethyl groups, and trimethoxysilylpropyl groups; alkoxy groups such as methoxy groups, ethoxy groups, propoxy groups, and glycidoxy alkyl groups such as glycidoxypropyl groups and glycidoxybutyl groups. Examples of molecular structures of the organopolysiloxane having at least an average of 1.5 silicon-bonded hydrogen atoms in a molecule include a straight chain structure, a partially branched straight chain structure, a branched chain structure, a reticulated structure, and a dendritic structure. The organopolysiloxane having at least an average of 1.5 silicon-bonded hydrogen atoms in a molecule can be a mixture of two or more types of organopolysiloxanes having these molecular structures. A viscosity at 25° C. of the organopolysiloxane having at least an average of 1.5 silicon-bonded hydrogen atoms in a molecule can be within the range of from 1 to 500,000 mPa·s, such as within the range of from 1 to 1,000 mPa·s.

Examples of the organopolysiloxane for the organopolysiloxane having at least an average of 1.5 silicon-bonded hydrogen atoms in a molecule include, but are not limited to, methylhydrogenpolysiloxanes capped at both molecular terminals with trimethylsiloxy groups, dimethylsiloxane-methylhydrogensiloxane copolymers capped at both molecular terminals with trimethylsiloxy groups, methylhydrogensiloxane-methylphenylsiloxane copolymers capped at both molecular terminals with trimethylsiloxy groups, dimethylsiloxane-methylhydrogensiloxane-methylphenylsiloxane copolymers capped at both molecular terminals with trimethylsiloxy groups, dimethylpolysiloxanes capped at both molecular terminals with dimethylhydrogensiloxy groups, methylhydrogenpolysiloxanes capped at both molecular terminals with dimethylhydrogensiloxy groups, dimethylsiloxane-methylhydrogensiloxane copolymers capped at both molecular terminals with dimethylhydrogensiloxy groups, dimethylsiloxane-methylphenylsiloxane copolymers capped at both molecular terminals with dimethylhydrogensiloxy groups, dimethylsiloxane-methylhydrogensiloxane-methylphenylsiloxane copolymers capped at both molecular terminals with dimethylhydrogensiloxy groups, organopolysiloxanes comprising a unit represented by the formula: $R'_3SiO_{1/2}$ and a unit represented by the formula: $SiO_{4/2}$, organopolysiloxanes comprising a unit represented by the formula: $R'_{3/2}$, organopolysiloxanes comprising a unit represented by the formula: $R'_2SiO_{2/2}$ and a unit represented by the formula: $R'SiO_{3/2}$, organopolysiloxanes comprising a unit represented by the formula: $R'_2SiO_{2/2}$, a unit represented by the formula: $R'SiO_{3/2}$, and a unit represented by the formula: $SiO_{4/2}$, methylhydrogensiloxane-methyl(trimethoxysilylethyl)siloxane copolymers capped at both molecular terminals with trimethylsiloxy groups, methylhydrogensiloxane-methyl(trimethoxysilylethyl)siloxane-methyl(3-glycidoxypropyl)siloxane copolymers capped at both molecular terminals with trimethylsiloxy groups, dimethylsiloxane-methylhydrogensiloxane-methyl(trimethoxysilylethyl)siloxane copolymers capped at both molecular terminals with trimethylsiloxy groups, dimethylsiloxane-methylhydrogensiloxane-methyl(trimethoxysilylethyl)siloxane-methyl(3-glycidoxypropyl)siloxane copolymers capped at both molecular terminals with trimethylsiloxy groups, methylhydrogensiloxane-methyl(triethoxysilylethyl)siloxane copolymers capped at both molecular terminals with trimethylsiloxy groups, methylhydrogensiloxane-methyl(triethoxysilylethyl)siloxane-methyl(3-glycidoxypropyl)siloxane copolymers capped at both molecular terminals with trimethylsiloxy groups, dimethylsiloxane-methylhydrogensiloxane-methyl(trimethoxysilylethyl)siloxane copolymers capped at both molecular terminals with trimethylsiloxy groups, dimethylsiloxane-methylhydrogensiloxane-methyl(triethoxysilylethyl)siloxane-methyl(3-glycidoxypropyl)siloxane copolymers capped at both molecular terminals with trimethylsiloxy groups, and mixtures of two or more types of these organopolysiloxanes. R' in the formulas above is a substituted or unsubstituted monovalent hydrocarbon group, and examples of this monovalent hydrocarbon group include the alkyl groups, alkenyl groups, aryl groups, aralkyl groups, or halogenated alkyl groups described above. In one aspect, the organopolysiloxane having at least an average of 1.5 silicon-bonded hydrogen atoms in a molecule can be a mixture of an organopolysiloxane having silicon-bonded hydrogen atoms only at both molecular terminals and an organopolysiloxane having at least 3 silicon-bonded hydrogen atoms in a molecule due to the excellent mechanical characteristics—the elongation, in particular—of the cured product formed by the present composition.

A content of the organopolysiloxane having at least an average of 1.5 silicon-bonded hydrogen atoms in a molecule can be in an amount such that a quantity of silicon-bonded hydrogen atoms in the organopolysiloxane having at least an average of 1.5 silicon-bonded hydrogen atoms in a molecule is within the range of from 0.05 to 20 mol per 1 mol of alkenyl groups in an organopolysiloxane represented by the average unit formula $R_aSiO_{(4-a)/2}$, for example within the range of from 0.1 to 20 mol, and such as within the range of from 0.1 to 10 mol. If the content of the organopolysiloxane having at least an average of 1.5 silicon-bonded hydrogen atoms in a molecule is less than the lower limit of the range described above, the composition will tend not to be cured sufficiently, whereas if the content exceeds the upper limit of the range described above, the composition will tend to foam during curing, which diminishes the mechanical characteristics of the cured product formed by the composition.

In one aspect, the curable organopolysiloxane composition further comprises a reaction inhibitor in an amount of from 0.001 to 5 parts by weight per 100 parts by weight of the organopolysiloxane represented by the average unit formula $R_aSiO_{(4-a)/2}$. reaction inhibitor as an additional optional component for regulating the hydrosilylation reaction of the present composition. Non-limiting examples of reaction inhibitors include acetylene alcohols such as 1-ethynyl-1-cyclohexanol, 2-methyl-3-butyn-2-ol, 2-phenyl-3-butyn-2-ol, 2-ethynylisopropanol, 2-ethynylbutan-2-ol, and 3,5-dimethyl-1-hexyn-3-ol; silylated acetylene alcohols such as trimethyl(3,5-dimethyl-1-hexyn-3-oxy)silane, methylvinylbis(3-methyl-1-butyn-3-oxy)silane, and ((1,1-dimethyl-2-propynyl)oxy)trimethylsilane; unsaturated carboxylic acid esters such as diallyl maleate, dimethyl maleate, diethylfumarate, diallyl fumarate, and bis(methoxyisopropyl)maleate; conjugated ene-yne compounds such as 2-isobutyl-1-buten-3-yne, 3,5-dimethyl-3-hexen-1-yne, 3-methyl-3-penten-1-yne, 3-methyl-3-hexen-1-yne, 1-ethynylcyclohexene, 3-ethyl-3-buten-1-yne, and 3-phenyl-3-buten-1-yne; and alkenyl group-containing cyclic siloxanes such as 1,3,5,7-tetramethyl-1,3,5,7-tetravinylcyclotetrasiloxane.

In one aspect, the curable organopolysiloxane composition further comprises fillers and treating agents. Non-limiting examples of fillers include silicone dioxide fillers such as fumed silica, colloidal silica, precipitated silica, crystalline quartz, and diatomaceous earth; carbon fillers such as carbon black, carbon fiber, carbon nanotubes, graphite, graphene, and reduced graphite oxides; metal oxides such as titanium dioxide, aluminum oxide, iron oxide, zinc oxide, and indium tin oxide; metals such as silver and gold; calcium carbonate; microballoon, for example a glass microballoon; and boron nitride. The fillers can be pretreated or in-situ treated with treating agents. Non-limiting examples of treating agents include silazanes (hexamethyldisilazane, divinyltetramethylsilazane, etc.), cyclic silazanes (dimethylcyclicsilazane, 1,3,5,7-tetravinyl-1,3,5,7-tetramethylcyclotetrasilazane, etc.), and low molecular weight silicone fluids (octamethylcyclotetrasiloxane, decamethylcyclopentasiloxane, etc.). Fillers used can be present from about 0 to 80% by weight, preferably 10 to 40 wt %. The amount of treating agents is determined by the amount of fillers and filler's surface areas, can be present from 0 to 30 wt %, preferably from 0.5-10 wt %.

In one aspect, the particle disclosed herein is present in an amount effective to promote crosslinking of the curable organopolysiloxane composition by a hydrosilylation reaction. For example, the particle disclosed herein can be present from 0.05 wt % to 5 wt % based on the total weight of the curable organopolysiloxane composition. In another example, the particle disclosed herein can be present from 0.5 wt % to 5 wt % based on the total weight of the curable organopolysiloxane composition. In yet another example, the particle disclosed herein can be present from 1 wt % to 5 wt % based on the total weight of the curable organopolysiloxane composition. In yet another example, the particle disclosed herein can be present from 3 wt % to 5 wt % based on the total weight of the curable organopolysiloxane composition. In yet another example, the particle disclosed herein can be present from 0.05 wt % to 3 wt % based on the total weight of the curable organopolysiloxane composition. In yet another example, the particle disclosed herein can be present from 0.05 wt % to 1 wt % based on the total weight of the curable organopolysiloxane composition. In yet another example, the particle disclosed herein can be present from 0.05 wt % to 0.5 wt % based on the total weight of the curable organopolysiloxane composition.

In one aspect, the curable organopolysiloxane composition can be a homogeneous mixture of all components present in the curable organopolysiloxane composition. For example, the curable organopolysiloxane composition can be a homogeneous mixture of the organopolysiloxane represented by the average unit formula: $R_aSiO_{(4-a)/2}$, the organopolysiloxane having at least an average of 1.5 silicon-bonded hydrogen atoms in a molecule, and the particle disclosed herein. In one aspect, the particle disclosed herein can be homogeneously dispersed with the other components in the curable organopolysiloxane composition.

The curable organopolysiloxane composition can be made herein by mixing the components in the curable organopolysiloxane composition.

D. METHODS

Also disclosed herein, is a method of using the curable organopolysiloxane composition disclosed herein. Disclosed herein is a method comprising the steps of:
  a) providing a curable organopolysiloxane composition disclosed herein; and
  b) heating the curable organopolysiloxane composition to a temperature effective to melt the thermoplastic polymer to release the platinum-group catalyst, thereby promoting a crosslinking reaction between the organopolysiloxane represented by the average unit formula: $R_aSiO_{(4-a)/2}$ and the organopolysiloxane having at least an average of 1.5 silicon-bonded hydrogen atoms in a molecule, to cure the curable organopolysiloxane composition.

In one aspect, the temperature effective to melt the thermoplastic polymer is from about 30° C. to about 100° C. For example, the temperature effective to melt the thermoplastic polymer can be from about 40° C. to about 100° C. In another example, temperature effective to melt the thermoplastic polymer is from about 60° C. to about 90° C. When the thermoplastic polymer melts the platinum group catalyst becomes exposed to the organopolysiloxane components of the curable organopolysiloxane composition to cause the curable organopolysiloxane composition to cure.

In one aspect, the curing of the curable organopolysiloxane composition occurs for a period of time being from more than 0 min to 72 hours. For example, the curing of the curable organopolysiloxane composition can occur for a period of time being from more than 10 min to 72 hours. In another example, the curing of the curable organopolysiloxane composition can occur for a period of time being from more than 10 min to 48 hours. In yet another example, the curing of the curable organopolysiloxane composition can occur for a period of time being from more than 10 min to 24 hours. In yet another example, the curing of the curable organopolysiloxane composition can occur for a period of time being from more than 10 min to 18 hours. In yet another example, the curing of the curable organopolysiloxane composition can occur for a period of time being from more than 10 min to 12 hours. In yet another example, the curing of the curable organopolysiloxane composition can occur for a period of time being from more than 10 min to 6 hours. In yet another example, the curing of the curable organopolysiloxane composition can occur for a period of time being from more than 10 min to 3 hours. In yet another example, the curing of the curable organopolysiloxane composition can occur for a period of time being from more than 10 min to 1 hour. In yet another example, the curing of the curable organopolysiloxane composition can occur for a period of time being from more than 12 hours to 72 hours. In yet another example, the curing of the curable organopolysiloxane composition can occur for a period of time being from more than 24 hours to 72 hours.

In one aspect, providing the curable organopolysiloxane composition comprises applying the curable organopolysiloxane composition to a surface. In one aspect, the surface can be a surface located indoors. In another aspect, the surface can be in need of repair.

In one aspect, providing the curable organopolysiloxane composition comprises molding, extruding, or calendaring the curable organopolysiloxane composition. For example, providing the curable organopolysiloxane composition can comprise molding. In another aspect, providing the curable organopolysiloxane composition can comprise extruding. In another aspect, providing the curable organopolysiloxane composition can comprise calendaring.

E. ASPECTS

In view of the disclosure herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A particle comprising: a) a platinum-group catalyst; and b) a molecular weight controlled thermoplastic polymer having a $T_g$ or softening temperature of at least 20° C. selected from the group consisting of: i. polystyrene or a co-polymer thereof having a $M_w$ from about 500 g/mol to about 30,000 g/mol, and a polydispersity index (PDI) of less than 2; ii. polymethylmethacrylate or a co-polymer thereof having a $M_w$ from about 500 g/mol to about 30,000 g/mol, and a PDI of less than 2; iii. polyacrylonitrile or a co-polymer thereof having a $M_w$ from about 500 g/mol to about 30,000 g/mol, and a PDI of less than 2; wherein the platinum-group catalyst is fully encapsulated within the thermoplastic polymer.

Aspect 2: The particle of aspect 1, wherein the thermoplastic polymer is polystyrene or a co-polymer thereof having a $M_w$ from about 500 g/mol to about 30,000 g/mol, and a polydispersity index (PDI) of less than 2.

Aspect 3: The particle of aspects 1 or 2, wherein the polystyrene or a co-polymer thereof has a $M_w$ from about 1,000 g/mol to about 15,000 g/mol.

Aspect 4: The particle of aspects 2 or 3, wherein the polystyrene or a co-polymer thereof has a PDI of less than 1.5.

Aspect 5: The particle of aspects 2 or 3, wherein the polystyrene or a co-polymer thereof has a PDI of less than 1.2.

Aspect 6: The particle of aspect 1, wherein the thermoplastic polymer is polymethylmethacrylate or a co-polymer thereof having a $M_w$ from about 500 g/mol to about 30,000 g/mol, and a polydispersity index (PDI) of less than 2.

Aspect 7: The particle of aspect 6, wherein the polymethylmethacrylate or a co-polymer thereof has a $M_w$ from about 1,000 g/mol to about 15,000 g/mol.

Aspect 8: The particle of aspects 6 or 7, wherein the polymethylmethacrylate or a co-polymer thereof has a PDI of less than 1.5.

Aspect 9: The particle of aspects 6 or 7, wherein the polymethylmethacrylate or a co-polymer thereof has a PDI of less than 1.2.

Aspect 10: The particle of aspect 1, wherein the thermoplastic polymer is polyacrylonitrile or a co-polymer thereof having a $M_w$ from about 500 g/mol to about 30,000 g/mol, and a polydispersity index (PDI) of less than 2.

Aspect 11: The particle of aspect 10, wherein the polyacrylonitrile or a co-polymer thereof has a $M_w$ from about 1,000 g/mol to about 15,000 g/mol.

Aspect 12: The particle of aspects 10 or 11, wherein the polyacrylonitrile or a co-polymer thereof has a PDI of less than 1.5.

Aspect 13: The particle of aspects 10 or 11, wherein the polyacrylonitrile or a co-polymer thereof has a PDI of less than 1.2.

Aspect 14: The particle of any one of aspects 1-13, wherein the particle has an average particle diameter from about 0.01 µm to about 500 µm.

Aspect 15: The particle of any one of aspects 1-14, wherein the particle comprises from about 0.01 wt % to about 50 wt % of the platinum-group catalyst.

Aspect 16: A curable organopolysiloxane composition comprising: (A) an organopolysiloxane represented by the average unit formula: $R_aSiO_{(4-a)/2}$ wherein, R is a substituted or unsubstituted monovalent hydrocarbon group, and "a" is a number from 1.0 to 2.4, and having at least an average of 1.5 alkenyl groups in a molecule; (B) an organopolysiloxane having at least an average of 1.5 silicon-bonded hydrogen atoms in a molecule; and (C) a particle of any one of aspects 1-15.

Aspect 17: The curable organopolysiloxane composition of aspect 16, wherein the composition further comprises a reaction inhibitor in an amount of from 0.001 to 5 parts by weight per 100 parts by weight of component (A).

Aspect 18: The curable organopolysiloxane composition of aspects 16 or 17, wherein component (B) is present in an amount such that a quantity of silicon-bonded hydrogen atoms in component (B) is from 0.05 to 20 mol per 1 mol of alkenyl groups in component (A).

Aspect 19: The curable organopolysiloxane composition of any one of aspects 16-18, wherein component (C) is present in an amount effective to promote crosslinking of the curable organopolysiloxane composition by a hydrosilylation reaction.

Aspect 20: The curable organopolysiloxane composition of any one of aspects 16-19, wherein component (C) is homogeneously dispersed in components (A) and (B).

Aspect 21: The curable organopolysiloxane composition of any one of aspects 16-20, wherein the curable organopolysiloxane composition is a homogeneous mixture of components (A), (B) and (C).

Aspect 22: A method comprising the steps of: a) providing the curable organopolysiloxane composition of any one of aspects 16-21; and b) heating the curable organopolysiloxane composition to a temperature effective to melt the thermoplastic polymer to release the platinum-group catalyst, thereby promoting a crosslinking reaction between components (A) and (B) to cure the curable organopolysiloxane composition.

Aspect 23: The method of aspect 22, wherein the temperature effective to melt the thermoplastic polymer is from about 30° C. to about 100° C.

Aspect 24: The method of aspect 22, wherein the temperature effective to melt the thermoplastic polymer is from about 60° C. to about 90° C.

Aspect 25: The method of any one of aspects 22-24, wherein the curing of the curable organopolysiloxane composition occurs for a period of time being from more than 0 min to 72 hours.

Aspect 26: The method of any one of aspects 22-25, wherein providing the curable organopolysiloxane composition comprises applying the curable organopolysiloxane composition to a surface.

Aspect 27: The method of any one of aspects 22-25, wherein providing the curable organopolysiloxane composition comprises molding, extruding, or calendaring the curable organopolysiloxane composition.

F. EXAMPLES

The following examples are put forth so as to provide those of ordinary skill in the art with a complete disclosure and description of how the compounds, compositions, articles, devices, and/or methods described and aspected herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Provided herein are examples which show the preparation of non-limiting exemplary particles disclosed herein using molecular weight controlled polystyrene (PS) and molecular weight controlled poly(methyl methacrylate) (PMMA). Both an emulsion approach and a spray drying approach were used to prepare encapsulated Pt particles. The two approaches are identical for the purpose of particle preparation, and should not be limited to specific thermoplastic polymers. Example 1 and 2 are the preparation of encapsulated Pt particles using molecular weight controlled PS, and Example 3 is a control example using conventional PS ($M_w$ and PDI are outside the range of the particles disclosed herein) via the emulsion approach. Example 4 is the evaluation of the PS particles for use in one-part addition cure silicone compositions. Example 5 and 6 are the preparation of encapsulated Pt particles using molecular weight controlled PMMA and a control example using conventional PMMA ($M_w$ and PDI are outside the range of the particles disclosed herein), respectively, via a spray drying process. Example 7 is the evaluation of PMMA particles for use in one-part addition cure silicone composition.

i. Example 1 (Encapsulated Pt Using Molecular Weight Controlled PS)

A flask was filled with 400 g of methylene chloride, then charged with 15 g of low molecular weight PS ($M_w$=1800 Dalton, PDI=1.04). The solution was stirred using a magnetic stirrer until the polystyrene dissolved, then 3.0 g of Karstedt's catalyst in isopropyl alcohol solution (Pt content of ~3 wt %) was charged in the solution and mixed until homogenous. In a separate flask filled with 600 g deionized water, 15 g of polyvinyl alcohol (PVA) was charged and mixed until the solution became visibly clear. Into a 3-neck, 12 L flask equipped with an air-driven stirring rod, thermocouple, condenser, and heating mantle, 350 mL of the PVA solution and 200 mL of deionized water were charged. The stir rod was activated, followed by a drip feed of 180 mL of the above methylene chloride solution. After the addition, 900 mL of deionized water was charged into the emulsion mixture. Nitrogen ($N_2$) purging (2 liters per minute) was then applied to the flask, and the mixture was gradually heated to 40° C. within 4 hours and kept for another 6 hours with $N_2$ purging. The final mixture was milky with microparticles precipitated at flask bottom. The microparticles were then isolated by centrifugation (3500 rpm), washed by isopropyl alcohol and deionized water, and finally dried under vacuum at room temperature. The obtained catalyst was used to prepare composition A.

ii. Example 2 (Encapsulated Pt Using Molecular Weight Controlled PS)

The same process as described in Example 1 was used but with different molecular weight polystyrene. A flask was filled with 400 g of methylene chloride, then charged with 15 g of low molecular weight PS ($M_w$=4000 Dalton, PDI=1.04). The solution was stirred using a magnetic stirrer until the polystyrene dissolved, then 3.0 g of Karstedt's catalyst in isopropyl alcohol solution (Pt content of ~3 wt %) was charged in the solution and mixed until homogenous. In a separate flask filled with 600 g deionized water, 15 g of PVA was charged and mixed till the solution became visibly clear. Into a 3-neck, 12 L flask equipped with an air-driven stirring rod, thermocouple, condenser, and heating mantle, 350 mL of the PVA solution and 200 mL of deionized water were charged. The stir rod was activated, followed by a drip feed of 180 mL of the above methylene chloride solution. After the addition, 900 mL of deionized water was charged into the emulsion mixture. $N_2$ purging (2 liters per minute) was then applied to the flask, and the mixture was gradually heated to 40° C. within 4 hours and kept for another 6 hours with $N_2$ purging. The final mixture was milky with microparticles precipitated at flask bottom. The microparticles were then isolated by centrifugation (3500 rpm), washed by isopropyl alcohol and deionized water, and finally dried under vacuum at room temperature. The obtained catalyst was used to prepare composition B.

iii. Example 3 (Encapsulated Pt Using Conventional PS)—Control

The same process as described in Example 1 was used but with a polystyrene that has a molecular weight and PDI outside the scope of the particles disclosed herein. A flask was filled with 400 g of methylene chloride, then charged with 15 g of conventional PS ($M_w$=350 k Dalton, PDI=2.2). The solution was stirred using a magnetic stirrer until the polystyrene dissolved, then 3.0 g of Karstedt's catalyst in isopropyl alcohol solution (Pt content of ~3 wt %) was charged in the solution and mixed until homogenous. In a separate flask filled with 600 g deionized water, 15 g of PVA was charged and mixed till the solution became visibly clear. Into a 3-neck, 12 L flask equipped with an air-driven stirring rod, thermocouple, condenser, and heating mantle, 350 mL of the PVA solution and 200 mL of deionized water were charged. The stir rod was activated, followed by a drip feed of 180 mL of the above methylene chloride solution. After the addition, 900 mL of deionized water was charged into the emulsion mixture. $N_2$ purging (2 liters per minute) was then applied to the flask, and the mixture was gradually heated to 40° C. within 4 hours and kept for another 6 hours with N₂ purging. The final mixture was milky with microparticles precipitated at flask bottom. The microparticles were then isolated by centrifugation (3500 rpm), washed by isopropyl alcohol and deionized water, and finally dried under vacuum at room temperature. The obtained catalyst was used to prepare composition C.

iv. Example 4 (Evaluation of Encapsulated Pt in Different PS)

The performance of above-prepared encapsulated catalysts in different PS was tested in a one-part silicone composition comprising a silicone base (96.6 wt %), a polymethylhydrogen-dimethylsiloxane (2-20 cSt) crosslinker (2.9 wt %), and encapsulated Pt catalyst (0.5 wt %). The above-mentioned silicone base is composed of a dimethylvinylsiloxy-endblocked polydimethylsiloxane (5 k cP, 70 wt %), a trimethyl silyl treated fumed silica (surface area of 200 m²/g, 17 wt %) and a crystalline silica (Min-U-Sil 10, 13 wt %). The one-part composition was mixed into homogeneity by a Flack Teck DAC-400 mixer. Three compositions (noted as composition A, B and C) were obtained with the encapsulated Pt catalysts prepared from Examples 1-3, respectively. The curing profiles of the three compositions were evaluated by controlled stress rheometer (CSR, TA instrument).

v. Example 5 (Encapsulated Pt Using Molecular Weight Controlled PMMA)

A flask was filled with 400 g of methylene chloride, then charged with 15 g of low molecular weight PMMA ($M_w$=5000 Dalton, PDI=1.06). The solution was stirred using a magnetic stirrer until the PMMA dissolved, then 3.0 g of Karstedt's catalyst in isopropyl alcohol solution (Pt content of ~3 wt %) was charged in the solution and mixed until homogenous. The solution was spray dried by a spray dryer (Buchi B290) under N₂ flow with an inlet temperature of 65° C. The process yielded 11 g of encapsulated particles, which were then washed with deionized water (500 mL) and isopropyl alcohol (250 mL) with stirring. The washing solvents were removed by centrifugation (3500 rpm), and the obtained particles were dried under vacuum at room temperature. The obtained catalyst was used to prepare composition D.

vi. Example 6 (Encapsulated Pt Using Conventional PMMA)—Control

The same process as described in Example 5 was used but with a PMMA that has a molecular weight and PDI outside the scope of the particles disclosed herein. A flask was filled with 400 g of methylene chloride, then charged with 15 g of Mw controlled PMMA (Mw=76 k Dalton, PDI=2.34). The solution was stirred using a magnetic stirrer until the PMMA dissolved, then 3.0 g of Karstedt's catalyst in isopropyl alcohol solution (Pt content of ~3 wt %) was charged in the solution and mixed until homogenous. The solution was spray dried by a spray dryer (Buchi B290) under N₂ flow with an inlet temperature of 65° C. The process yielded 10 g of encapsulated particles, which were then washed with deionized water (500 mL) and isopropyl alcohol (250 mL) with stirring. The washing solvents were removed by centrifugation (3500 rpm), and the obtained particles were dried under vacuum at room temperature. The obtained catalyst was used to prepare composition E.

vii. Example 7 (Evaluation of Encapsulated Pt in Different PMMA)

The performance of above-prepared encapsulated catalysts in different PMMA was tested in a one-part silicone composition comprising a silicone base (96.6 wt %), a polymethylhydrogen-dimethylsiloxane (2-20 cSt) crosslinker (2.9 wt %), and encapsulated Pt catalyst (0.5 wt %). The above-mentioned silicone base is composed of a dimethylvinylsiloxy-endblocked polydimethylsiloxane (5 k cP, 70 wt %), a trimethyl silyl treated fumed silica (surface area of 200 m²/g, 17 wt %) and a crystalline silica (Min-U-Sil 10, 13 wt %). The one-part composition was mixed into homogeneity by a Flack Teck DAC-400 mixer. Two compositions (noted as composition D and E) were obtained with the encapsulated Pt catalysts prepared from Examples 5 and 6, respectively. The curing profiles of the two compositions were evaluated by controlled stress rheometer (CSR, TA instrument).

FIG. 1 shows the curing profiles of Compositions A, B and C monitored by CSR with temperature ramping from 25° C. to 100° C. for composition A, 25° C. to 120° C. for composition B, and 25° C. to 150° C. for composition C with a rate of 10° C./min.

Figure 2:
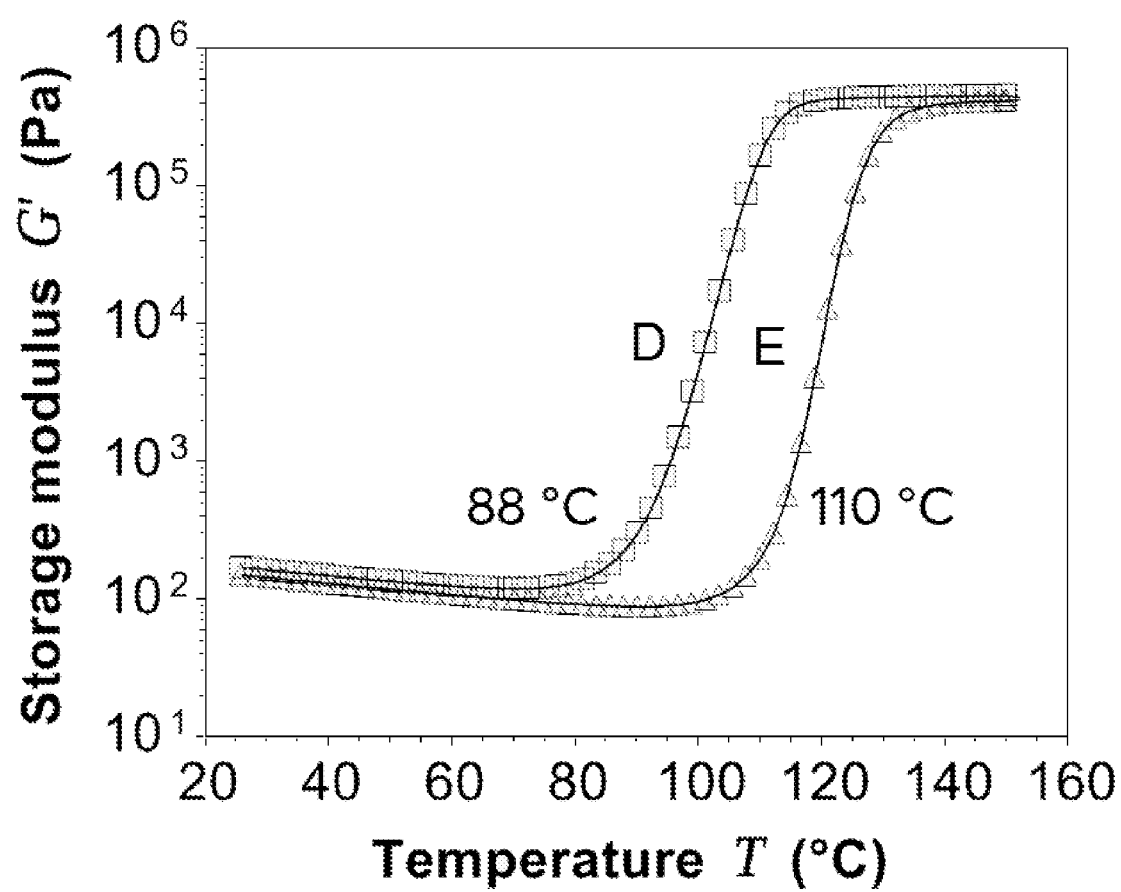
FIG. 2 shows curing profiles of one non-limiting exemplary one-part compositions (composition D, based on molecular weight controlled poly(methyl methacrylate)) disclosed herein and a control (composition E) by CSR.

FIG. 2 shows the curing profiles of Composition D and E monitored by CSR with temperature ramping from 25° C. to 150° C. with a rate of 10° C./min.

Distinctive activation temperatures (defined as the onset temperature when the storage modulus started to increase exponentially) were detected by CSR as shown in FIG. 1. Compositions A and B showed significantly lower activation temperature (68° C. and 89° C., respectively), as compared to Composition C (114° C.). This difference is due to the molecular weight controlled PS's used as the encapsulants for Karstedt's catalyst in Compositions A and B while a conventional PS used in Composition C. In addition, the rapid increase of storage modulus (i.e., the slope of curing profile) of both Composition A and B at the corresponding activation temperatures indicates a snap cure at low temperatures when comparing to Composition C. When PMMA, a different thermoplastic polymer from PS, is used to prepare encapsulate Pt catalyst (Examples D and E), the same behavior that the activation temperature can be adjusted by the molecular weight of PMMA was confirmed. As shown in FIG. 2, the molecular weight controlled PMMA (Composition D) leads to a low activation temperature of 88° C. and conventional PMMA results the activation temperature of 110° C. As illustrated in FIGS. 1 and 2, molecular weight controlled thermoplastic polymers exhibit glass transition temperatures ($T_g$) or softening temperatures lower than their corresponding persistent $T_g$, therefore, such encapsulated Pt catalyst can be released out of particles and initiate curing at lower temperatures (e.g., <100° C.) than the corresponding standard PS or PMMA.

Table 1 summarizes the activation temperature determined by CSR from compositions A-E, and the onset glass transition temperature ($T_g$) determined by differential scanning calorimetry (TA instrument) of PS and PMMA used as the encapsulant materials. It is shown that the lower $T_g$ of molecular weight controlled PS and PMMA is related to the low activation temperature of the composition.

TABLE 1

| One-part Composition | Activation Temp. (° C.) | Encapsulant material | Onset $T_g$ (° C.) |
|---|---|---|---|
| A | 68 | Molecular weight controlled PS | 54 |
| B | 89 | Molecular weight controlled PS | 79 |
| C | 114 | Conventional PS | 101 |
| D | 88 | Molecular weight controlled PMMA | 83 |
| E | 110 | Molecular weight controlled PMMA | 100 |

Figure 3:
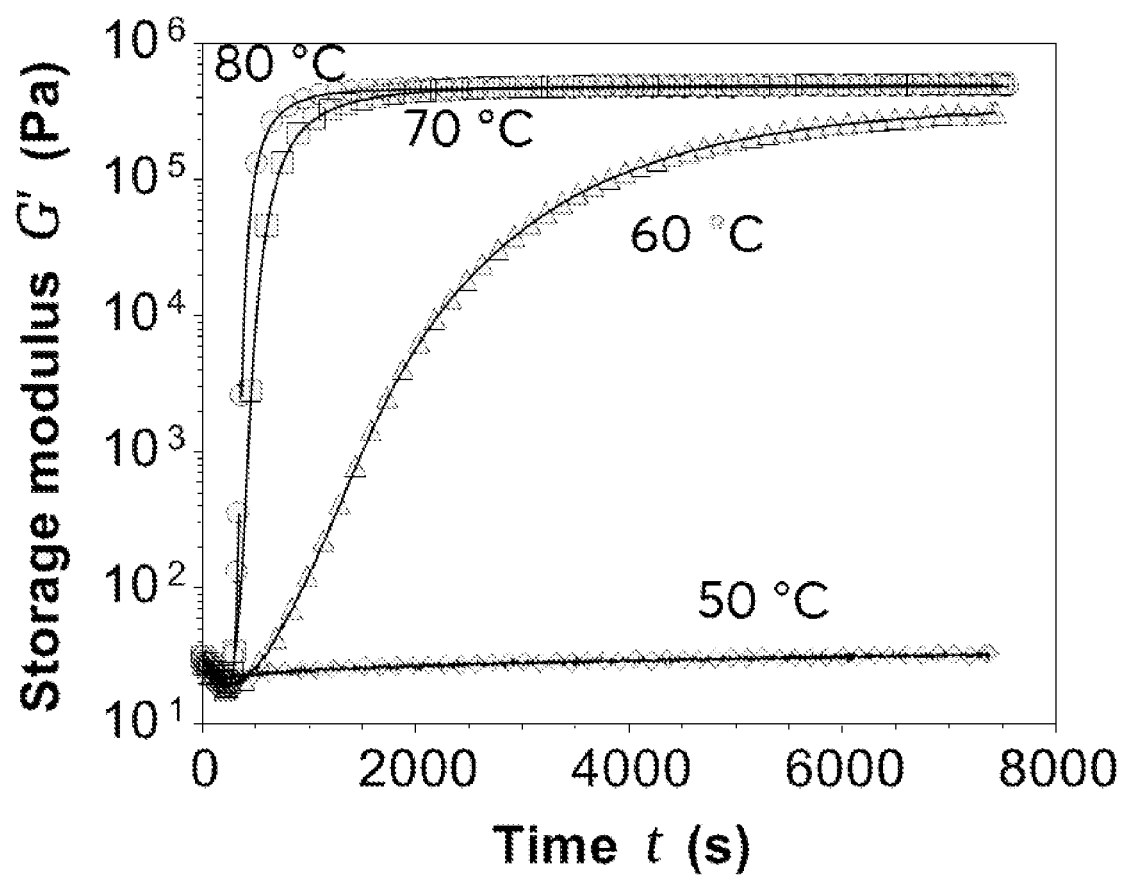
FIG. 3 shows the isothermal curing profiles of composition A at 50° C., 60° C., 70° C. and 80° C. by CSR.
Figure 4:
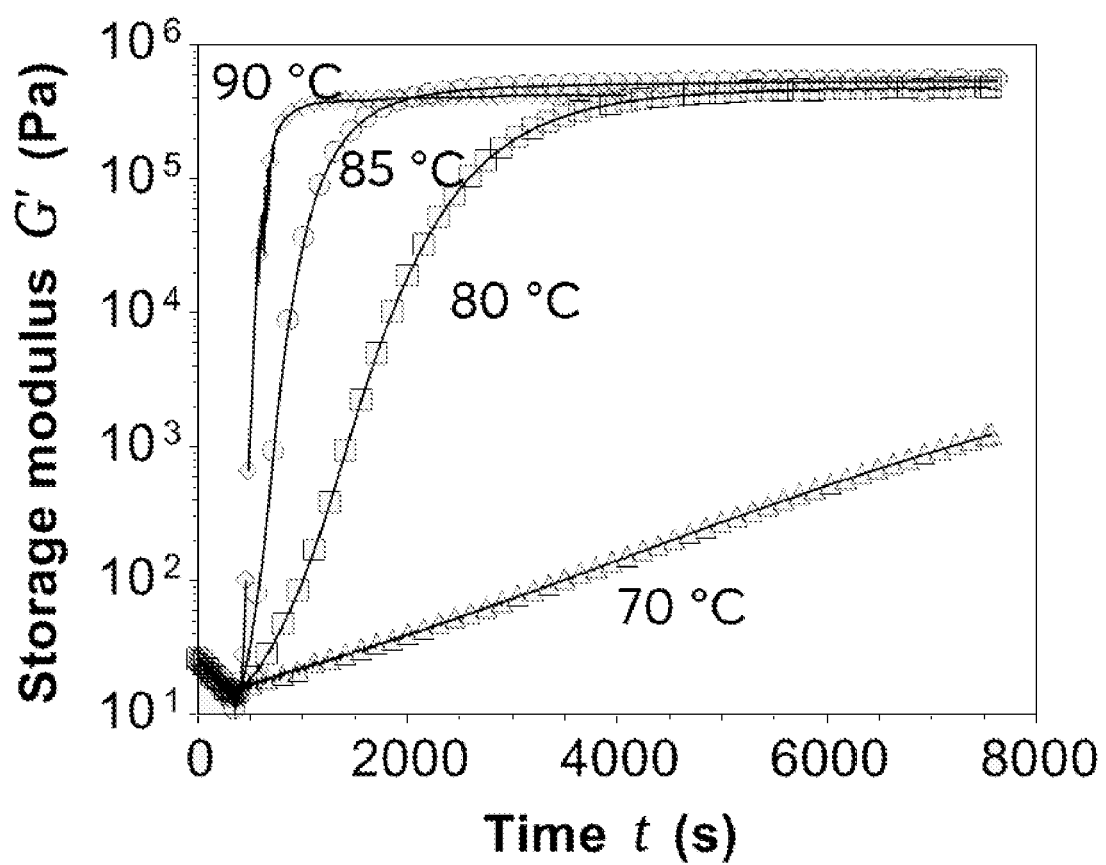
FIG. 4 shows the isothermal curing profiles of composition B at 70° C., 80° C., 85° C. and 90° C. by CSR.
Figure 5:
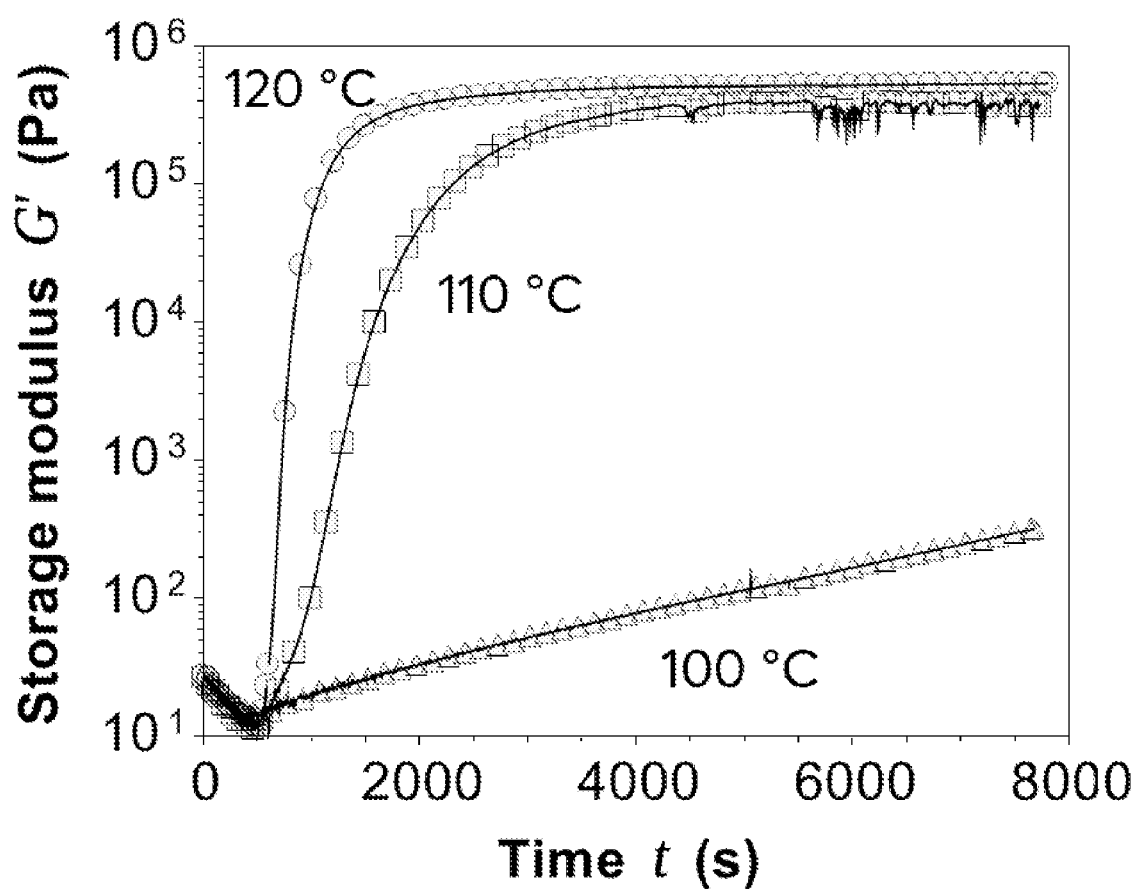
FIG. 5 shows the isothermal curing profiles of composition C at 100° C., 110° C. and 120° C. by CSR.
Figure 6:
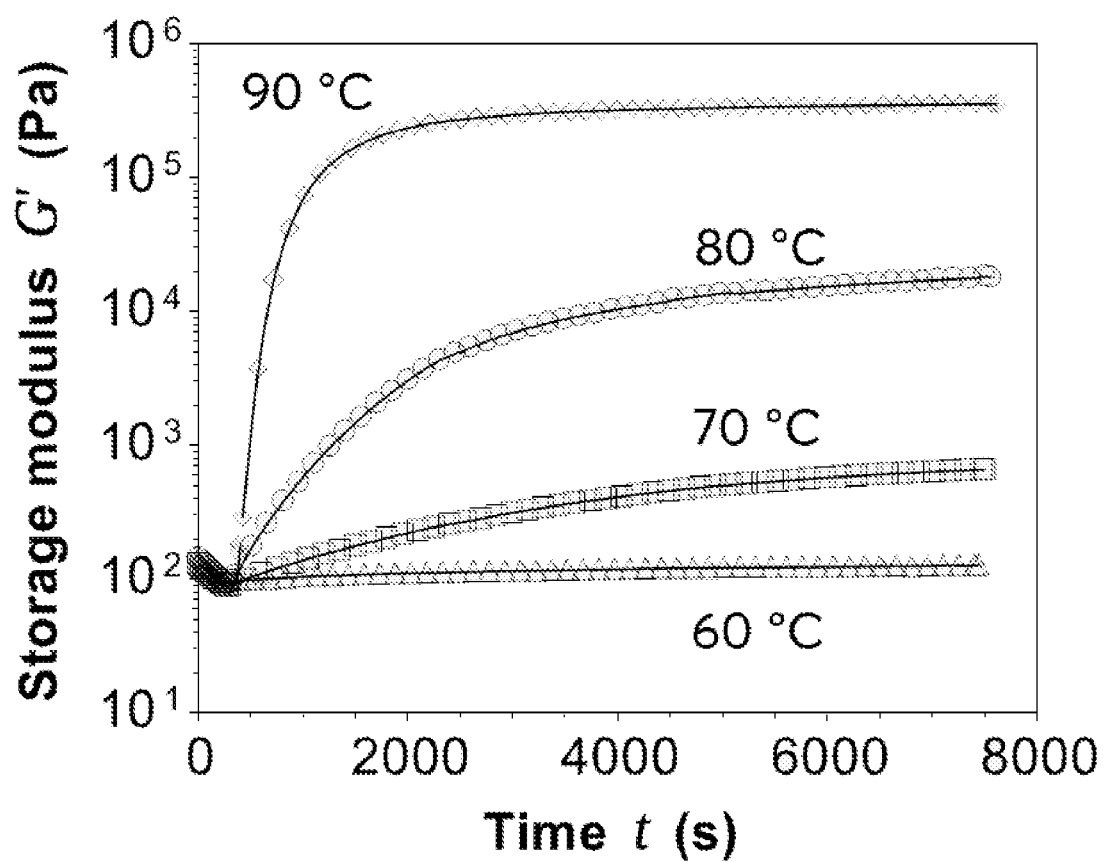
FIG. 6 shows the isothermal curing profiles of composition D at 60° C., 70° C., 80° C. and 90° C. by CSR.
Figure 7:
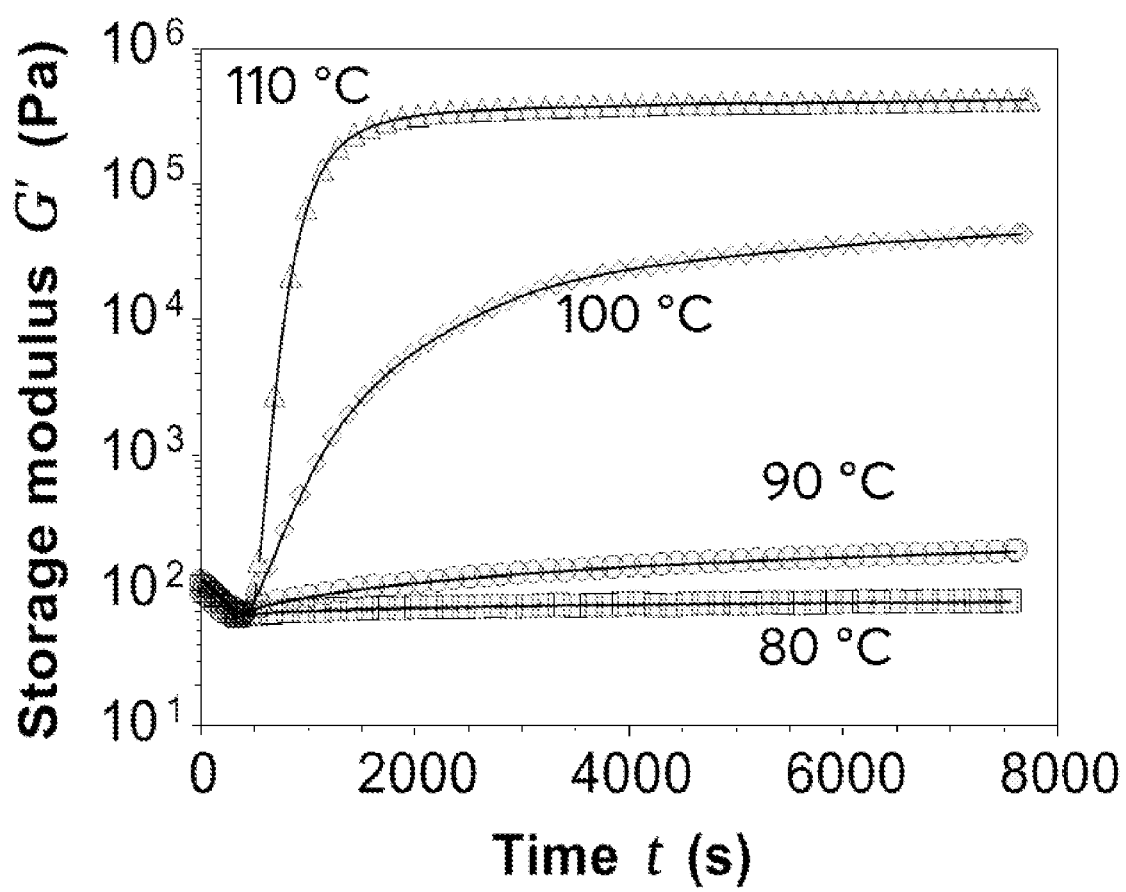
FIG. 7 shows the isothermal curing profiles of composition E at 80° C., 90° C., 100° C. and 110° C. by CSR.

FIG. 3 shows the isothermal curing profiles of composition A at 50° C., 60° C., 70° C. and 80° C. by CSR. FIG. 4 shows the isothermal curing profiles of composition B at 70° C., 80° C., 85° C. and 90° C. by CSR. FIG. 5 shows the isothermal curing profiles of composition C at 100° C., 110° C. and 120° C. by CSR. FIG. 6 shows the isothermal curing profiles of composition D at 60° C., 70° C., 80° C. and 90° C. by CSR. FIG. 7 shows the isothermal curing profiles of composition E at 80° C., 90° C., 100° C., and 110° C. by CSR.

Isothermal curing profiles of composition A-E at different temperatures were recorded by CSR as shown in FIGS. 3-7. For the encapsulated Pt catalyst prepared from PS, Composition A showed a snap cure when temperature is greater than 70° C. and almost non-curing when temperature is at 50° C. Composition B and C exhibited the similar snap cure when temperature is greater than 85° C. and 120° C., respectively. For the encapsulated Pt catalyst using PMMA, Composition D and E exhibited a snap cure when temperature is greater than 90° C. and 110° C., respectively. Additionally, the room temperature stability of three compositions was monitored. All the three samples showed no curing in a period of 6 months. The above results confirmed that molecular weight controlled PS for use in the encapsulation of Pt group catalyst can enable one-part addition cure silicone compositions having both low activation temperature and excellent storage life at room temperature.

What is claimed is:

1. A particle comprising:
a) a platinum-group catalyst; and
b) a molecular weight controlled thermoplastic polymer having a $T_g$ or softening temperature of at least 20° C. selected from the group consisting of:
   i. polystyrene or a co-polymer thereof having a $M_w$ from about 500 g/mol to about 30,000 g/mol, and a polydispersity index (PDI) of less than 2;
   ii. polymethylmethacrylate or a co-polymer thereof having a $M_w$ from about 500 g/mol to about 30,000 g/mol, and a PDI of less than 2;
   iii. polyacrylonitrile or a co-polymer thereof having a $M_w$ from about 500 g/mol to about 30,000 g/mol, and a PDI of less than 2;
wherein the platinum-group catalyst is fully encapsulated within the thermoplastic polymer.

2. The particle of claim 1, wherein the thermoplastic polymer is polystyrene or a co-polymer thereof having a $M_w$ from about 500 g/mol to about 30,000 g/mol, and a PDI of less than 2.

3. The particle of claim 2, wherein the polystyrene or a co-polymer thereof has a PDI of less than 1.2.

4. The particle of claim 1, wherein the polystyrene or a co-polymer thereof has a $M_w$ from about 1,000 g/mol to about 15,000 g/mol.

5. The particle of claim 1, wherein the thermoplastic polymer is polymethylmethacrylate or a co-polymer thereof having a $M_w$ from about 500 g/mol to about 30,000 g/mol, and a PDI of less than 2.

6. The particle of claim 5, wherein the polymethylmethacrylate or a co-polymer thereof has a $M_w$ from about 1,000 g/mol to about 15,000 g/mol.

7. The particle of claim 5, wherein the polymethylmethacrylate or a co-polymer thereof has a PDI of less than 1.2.

8. The particle of claim 1, wherein the thermoplastic polymer is polyacrylonitrile or a co-polymer thereof having a $M_w$ from about 500 g/mol to about 30,000 g/mol, and a PDI of less than 2.

9. The particle of claim 8, wherein the polyacrylonitrile or a co-polymer thereof has a $M_w$ from about 1,000 g/mol to about 15,000 g/mol.

10. The particle of claim 8, wherein the polyacrylonitrile or a co-polymer thereof has a PDI of less than 1.2.

11. The particle of claim 1, wherein the particle has an average particle diameter from about 0.01 μm to about 500 μm.

12. The particle of claim 1, wherein the particle comprises from about 0.01 wt % to about 50 wt % of the platinum-group catalyst.

13. A curable organopolysiloxane composition comprising:
(A) an organopolysiloxane represented by the average unit formula:

wherein, R is a substituted or unsubstituted monovalent hydrocarbon group, and "a" is a number from 1.0 to 2.4, and having at least an average of 1.5 alkenyl groups in a molecule;
(B) an organopolysiloxane having at least an average of 1.5 silicon-bonded hydrogen atoms in a molecule; and
(C) a particle of claim 1.

14. The curable organopolysiloxane composition of claim 13, wherein the composition further comprises a reaction inhibitor in an amount of from 0.001 to 5 parts by weight per 100 parts by weight of component (A).

15. The curable organopolysiloxane composition of claim 13, wherein component (B) is present in an amount such that a quantity of silicon-bonded hydrogen atoms in component (B) is from 0.05 to 20 mol per 1 mol of alkenyl groups in component (A).

16. The curable organopolysiloxane composition of claim 13, wherein component (C) is present in an amount effective to promote crosslinking of the curable organopolysiloxane composition by a hydrosilylation reaction.

17. The curable organopolysiloxane composition of claim 13, wherein component (C) is homogeneously dispersed in components (A) and (B).

18. The curable organopolysiloxane composition of claim 13, wherein the curable organopolysiloxane composition is a homogeneous mixture of components (A), (B) and (C).

19. A method comprising the steps of:
a) providing the curable organopolysiloxane composition of claim 16; and
b) heating the curable organopolysiloxane composition to a temperature effective to melt the thermoplastic polymer to release the platinum-group catalyst, thereby promoting a crosslinking reaction between components (A) and (B) to cure the curable organopolysiloxane composition.

20. The method of claim 19, wherein the temperature effective to melt the thermoplastic polymer is from about 30° C. to about 100° C.

\* \* \* \* \*